United States Patent [19]

Wipper

[11] Patent Number: 5,253,751
[45] Date of Patent: Oct. 19, 1993

[54] PACKAGING FOR COMPACT DISCS

[75] Inventor: Robert W. Wipper, Washington Township, Bergen County, N.J.

[73] Assignee: Sony Music Entertainment Inc., New York, N.Y.

[21] Appl. No.: 780,633

[22] Filed: Oct. 23, 1991

[51] Int. Cl.$^5$ .................. B65D 5/50; B65D 85/30; B65D 85/57

[52] U.S. Cl. .................. 206/45.19; 206/45.23; 206/309; 206/310; 206/312; 206/444

[58] Field of Search .............. 206/45.14, 45.19, 45.23, 206/45.33, 232, 309, 310, 311, 312, 444, 497

[56] References Cited

U.S. PATENT DOCUMENTS

| | | | |
|---|---|---|---|
| 4,381,836 | 5/1983 | Rivkin et al. | 206/387 |
| 4,520,470 | 5/1985 | d'Alayer de Costemore | 206/310 |
| 4,535,888 | 8/1985 | Nusselder | 206/444 |
| 4,572,369 | 2/1986 | Morris | 206/387 |
| 4,620,630 | 11/1986 | Moss | 206/313 |
| 4,623,062 | 11/1986 | Chase et al. | 206/311 |
| 4,627,531 | 12/1986 | Clemens | 206/444 |
| 4,635,792 | 1/1987 | Yamada et al. | 206/310 |
| 4,694,954 | 9/1987 | Moss | 206/312 |
| 4,709,812 | 12/1987 | Kosterka | 206/310 |
| 4,709,813 | 12/1987 | Wildt | 206/312 |
| 4,714,161 | 12/1987 | Thorud | 206/387 |
| 4,718,547 | 1/1988 | MacTavish | 206/309 |
| 4,736,840 | 4/1988 | Deiglmeir | 206/313 |
| 4,750,611 | 6/1988 | Morrone | 206/444 |
| 4,750,618 | 6/1988 | Schubert | 206/309 |
| 4,759,442 | 7/1988 | Gregerson et al. | 206/387 |
| 4,760,914 | 8/1988 | Gelardi et al. | 206/1.5 |
| 4,771,883 | 9/1988 | Herr et al. | 206/313 |
| 4,793,479 | 12/1988 | Otsuka et al. | 206/310 |
| 4,793,480 | 12/1988 | Gelardi et al. | 206/312 |
| 4,805,769 | 2/1989 | Soltis et al. | 206/309 |
| 4,805,770 | 2/1989 | Grobecker et al. | 206/309 |
| 4,819,799 | 4/1989 | Nomula et al. | 206/310 |
| 4,850,477 | 7/1989 | Gelardi et al. | 206/45.19 |
| 4,867,302 | 9/1989 | Takahashi | 206/312 |
| 4,874,085 | 10/1989 | Grobecker et al. | 206/309 |
| 4,895,252 | 1/1990 | Nomula et al. | 206/312 |
| 4,978,005 | 12/1990 | Sammet | 206/312 |
| 4,993,552 | 2/1991 | Bugbey et al. | 206/309 |
| 5,000,316 | 3/1991 | Lerner | 206/309 |

OTHER PUBLICATIONS

Billboard, Oct. 20, 1990 entitled "CD Packaging Debate Giving Industry A Long Look at Longbox Alternature".

Wall Street Journal–Summer 1991 entitled "Music Firms Try Out 'Green' CB Boxes".

*Primary Examiner*—David T. Fidei
*Attorney, Agent, or Firm*—Rosenman & Colin

[57] ABSTRACT

A package for the retail display of a compact disc includes the hingedly connected base and cover of the conventional "jewel box", and a tray in which the disc is removably secured by a circular array of flexible fingers, in which the tray differs from the conventional tray in that it is transparent, instead of opaque, and has a narrow slot formed in the elevated portion which extends along its entire length. The compact disc is placed face down in the tray, and the tray is placed face down in the conventional box cover with the slot in the elevated portion receiving and firmly engaging the hinged-end wall of the base to thereby jamb the hinge and lock the box full-open. The locked-open box is shrink-wrapped with transparent film so as to make artwork on the disc itself, and other artwork placed on other available surfaces, clearly visible to browsing purchasers. After purchase, the customer removes the shrinkwrap—the only discardable component of the package—removes the tray from the cover and places it face up in the base, allowing the cover to be closed over the base for storage of the disc.

10 Claims, 3 Drawing Sheets

PACKAGING FOR COMPACT DISCS

BACKGROUND OF THE INVENTION

This invention relates in general to packaging for items sold on the retail market and, more particularly, to a retail package for a compact disc.

DESCRIPTION OF THE RELATED ART

Currently, compact discs are enclosed in a hinged, transparent storage box known as a "jewel box" having dimensions when closed very similar to those of the disc itself and in which the disc is stored after purchase. The jewel box consists of three molded plastic parts: a transparent base, a transparent cover hinged to the base and an opaque tray removably secured in the base and having a centrally located circular array of flexible spring fingers which frictionally engage the edge of the center hole of a disc. This storage box, with the compact disc inside and closed, is most commonly sold at retail in a package format called a "long box" which is approximately twice as long as the width of the jewel box, approximately 6 inches ×2 inches. After purchase, the consumer discards the packaging, generating millions of pounds of waste paper annually. This larger so called "open format" is preferred however, not only because it is less easily shoplifted, but also still permits utilization of existing merchandising racks that allow browsing and encourage impulse buying and provides greater area for the display of information and/or advertising material about the recordings on the disc to attract and inform customers.

Among recent proposals for eliminating packaging waste while retaining the desired open format are the following:

(a) Utilize a blister pack of relatively thick transparent plastic to hold the jewel box in the open position. This approach satisfies most of the aforementioned objections except that the problem of waste disposal is shifted from paper to plastic.

(b) Glue the plastic tray of the conventional jewel box to a piece of cardboard having multiple panels that fold into a long box shape for retail and which can be refolded by the consumer, with the tray and compact disc inside, into a cardboard box having the size of a jewel box for home storage. This package design, known in the industry as "Eco-pak" and "Digitrac", while eliminating paper waste, has the disadvantages of being susceptible to damage and wear similar to that experienced with record jackets, and that it is difficult for the consumer to access the compact disc.

(c) Replace the existing jewel box with a package which generally comprises a molded thermoplastic drawer configured to accept a compact disc and which is insertable within an outer box-like housing. The drawer is partially withdrawn from the housing to provide an open format for retail display, and has a hinge for folding down part of the bottom to facilitate removal of the compact disc. While this design, known as "Laserfile" and described in Herr et al U.S. Pat. No. 4,771,883, addresses the paper waste problem and in the retracted position of the drawer provides the desired open display format, its adoption would be costly, in both time and money, because it would involve scrapping the molds for the jewel box, which is the standard CD package in the rest of the world, and completely redesigning new molds for producing the drawer and housing and also new automatic handling machinery for placing the compact disc in the drawer, partially inserting the drawer in the housing and shrink-wrapping the assembly.

SUMMARY OF THE INVENTION

A primary object of the present invention is to provide a package for compact discs having dimensions generally corresponding to the current long box to enable display on existing retail display racks and which has no disposable components other than plastic shrink-wrap plastic film.

Another object of the invention is to provide a retail package for a compact disc which is easily and inexpensively manufactured and is amenable to automated assembly.

A more specific object of the invention is to provide a retail package which utilizes, with minor modification, the components of the conventional jewel box thereby enabling conversion to an essentially waste-free package at minimum cost and time.

Still another object is to provide a retail package which when in its open format displays and at the same time protects the compact disc, and maximizes the space for displaying information or advertisement.

Briefly, the foregoing objects are achieved by modifying the construction of the tray of the jewel box and assembling the modified tray in the cover, instead of the base, of the jewel box in such a way as to lock the box in the full open position, and shrink-wrapping the locked-open box in a transparent plastic film. More particularly, the tray preferably is formed of a transparent plastic material and has a slot extending along the entire length of the elevated portion at a location such that when the tray is placed face down in the box cover the hinge-end wall of the base is received in the slot, thereby jamming the hinge and firmly locking the box open. The recorded surface of the disc is protected against damage by the cover and its label surface, which carries graphics including the titles of the recorded selections, is visible to a browsing customer through the transparent tray. The booklet usually placed inside the cover may, instead, be placed in the base where both its front and back covers would be visible through the transparent shrink-wrap and base, or it may be kept in the cover and the tray placed on top of it. The outside surfaces of the base and cover of the locked-open box presents a substantially uninterrupted planar surface on which additional graphics may be supported for display. For example, this may be a photograph of the artist of a size to cover the entire surface.

After purchase, the consumer has only to remove and discard the shrink-wrap, remove the tray from the cover and re-position it face up in the base, and if not already there, position the booklet in its usual place in the cover. Re-positioning the tray unlocks the hinge and allows the cover to be closed in the usual manner to provide the usual storage box for the disc.

Other objects, features and advantages of the invention will become apparent, and its construction and operation better understood, from the following detailed description when read in conjunction with the accompanying drawings.

DESCRIPTION OF THE PREFERRED EMBODIMENT

Figure 1:
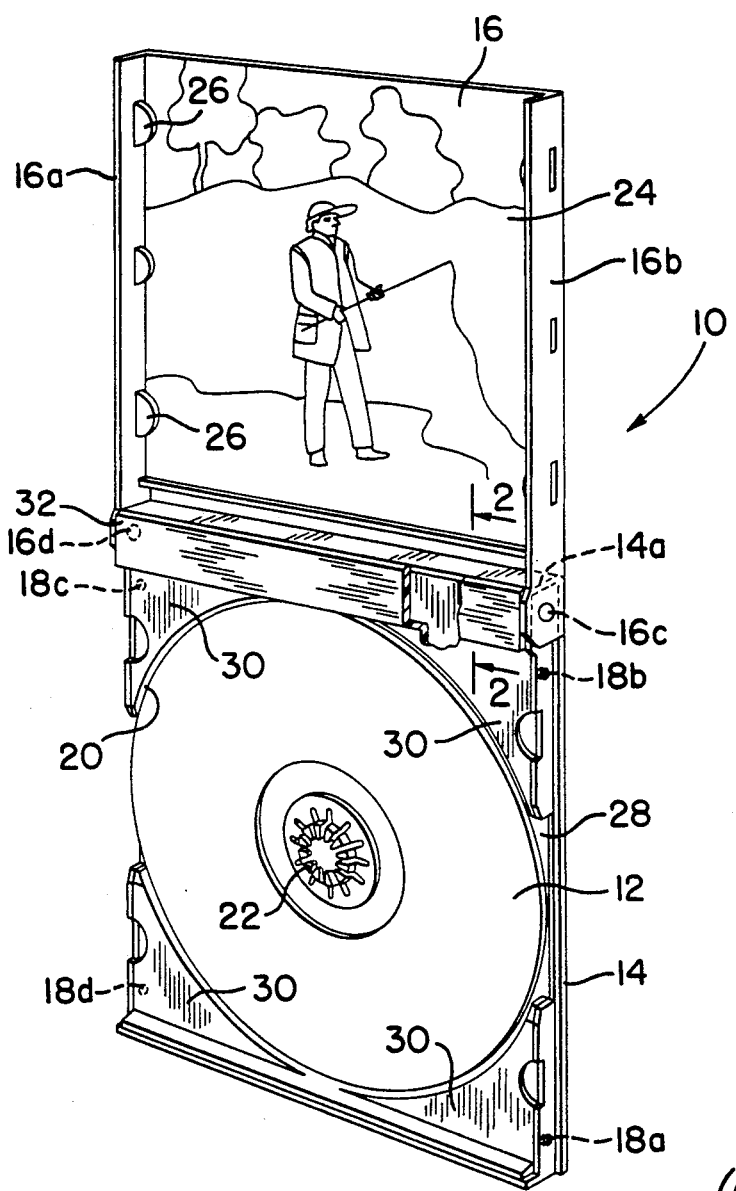
FIG. 1 is a perspective view of the current jewel box.

Referring to FIG. 1, the currently preferred package for compact discs is the jewel box 10, shown in its open position, which has dimensions when closed very similar to those of the disc 12 itself and in which the disc is stored after purchase. The box 10 consists of three molded plastic parts: a base 14 formed of hard transparent plastic, a cover 16 also formed of hard transparent plastic, and a tray 18 usually made of thin opaque plastic material. The tray is removably attached to the base by four protuberances 18a, 18b, 18c and 18d which snap into mating openings formed in the sidewalls of the base. The tray has a circular recess 20 in its upper surface in which the disc 12 is supported with its art-work bearing surface facing upward and secured by a circular array of spring fingers 22 which frictionally engage the edge of its center hole.

The cover 16 has parallel side walls 16a and 16b, but no end walls, and is hingedly joined at one edge to the base 14 by a pair of pins 16c and 16d which project inwardly from the cover side walls and engage mating openings formed in the base side walls near one end thereof; thus, the side walls of the cover overlie the side walls of the base 14 when the box is closed. The base has walls at both ends which with its side walls define a shallow box 4¾ inches wide and 5½ inches long. The spacing between the inner surfaces of the side walls of cover 16 is greater than the spacing between the inner surfaces of the side walls of the base 14 by twice the 1/16-inch thickness of the base side walls. As noted earlier, the cover and base are transparent so that graphics on both the front and back cover of a booklet 24 placed inside the cover and retained by plurality of tabs 26 projecting inwardly from the side walls, are visible to a browsing purchaser when the box is open.

Figure 2:
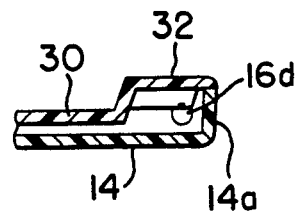
FIG. 2 is a fragmentary cross-sectional view taken along line 2—2 of FIG. 1.

The upper face of the tray 18 has three distinct levels: the flat bottom 28 of the circular recess 20; four corner areas 30 each having a flat surface disposed parallel to and upwardly from the bottom of the recess by approximately twice the thickness of the compact disc 12; and a ½ inch wide elevated portion 32 which extends along the width of the tray at the hinged edge of the box and is 3/16 inch above the plane of the areas 30. The upper surface of the elevated portion is substantially coplanar with the outer surface of the cover 16 when the box is closed. An overhang at each end of the elevated portion having a length equal to the wall thickness extends over respective side walls of the base, and as seen in FIG. 2, the elevated portion has an extension which projects beyond the hinge connections 16c and 16c and overlies end wall 14a of the base.

Figure 3:
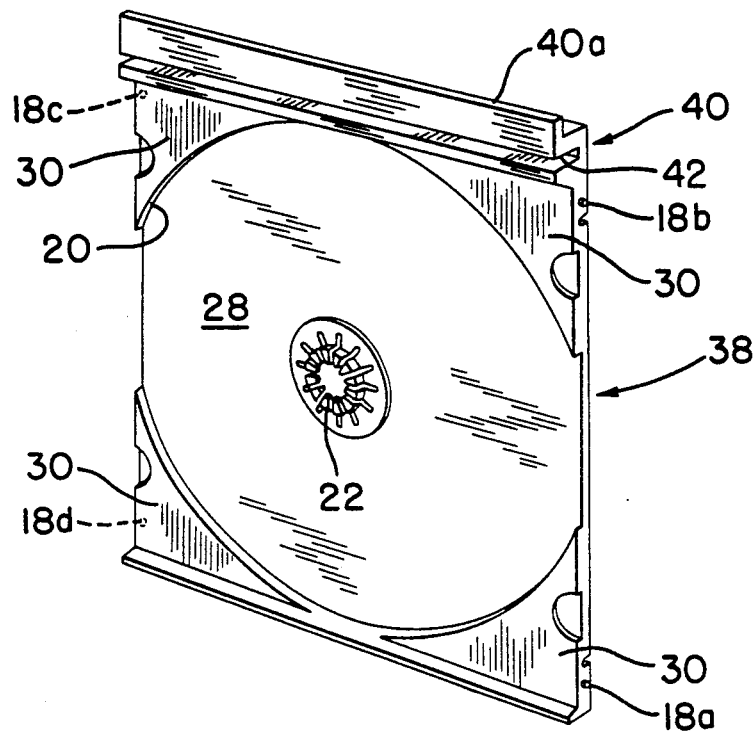
FIG. 3 is a perspective view of a jewel box tray modified according to the invention.

The compact disc package according to the invention utilizes the base and cover of the jewel box without change, thus avoiding the need for retooling to fabricate these parts. The objects of the invention are realized by modifying the construction of only the tray in the manner illustrated in FIG. 3. The elevated portion only of the tray is modified, in two respects, both of which are readily accomplished during molding, namely: (1) removal of the overhang at each end to give it an overall length of 4⅝ inches so that it can be placed inside the jewel box cover; and (2) providing a narrow slot 42 in the upper surface which extends along its entire length. The elevated portion 40 is ½ inch wide, the same as in the existing tray, and the slot is 1/16 inch wide and is spaced approximately 1/16 inch from the inner edge. The slot is ¼ inch deep, slightly less than the 5/16 inch height of the end walls of the base of the jewel box.

Figure 5:
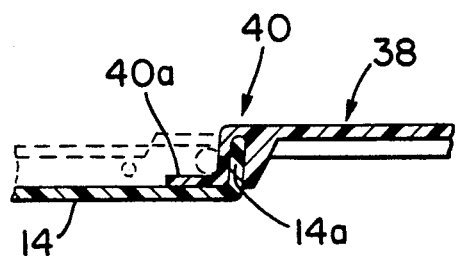
FIG. 5 is a fragmentary elevation cross-section view showing how the tray interacts with the base to lock the box open.
Figure 4:
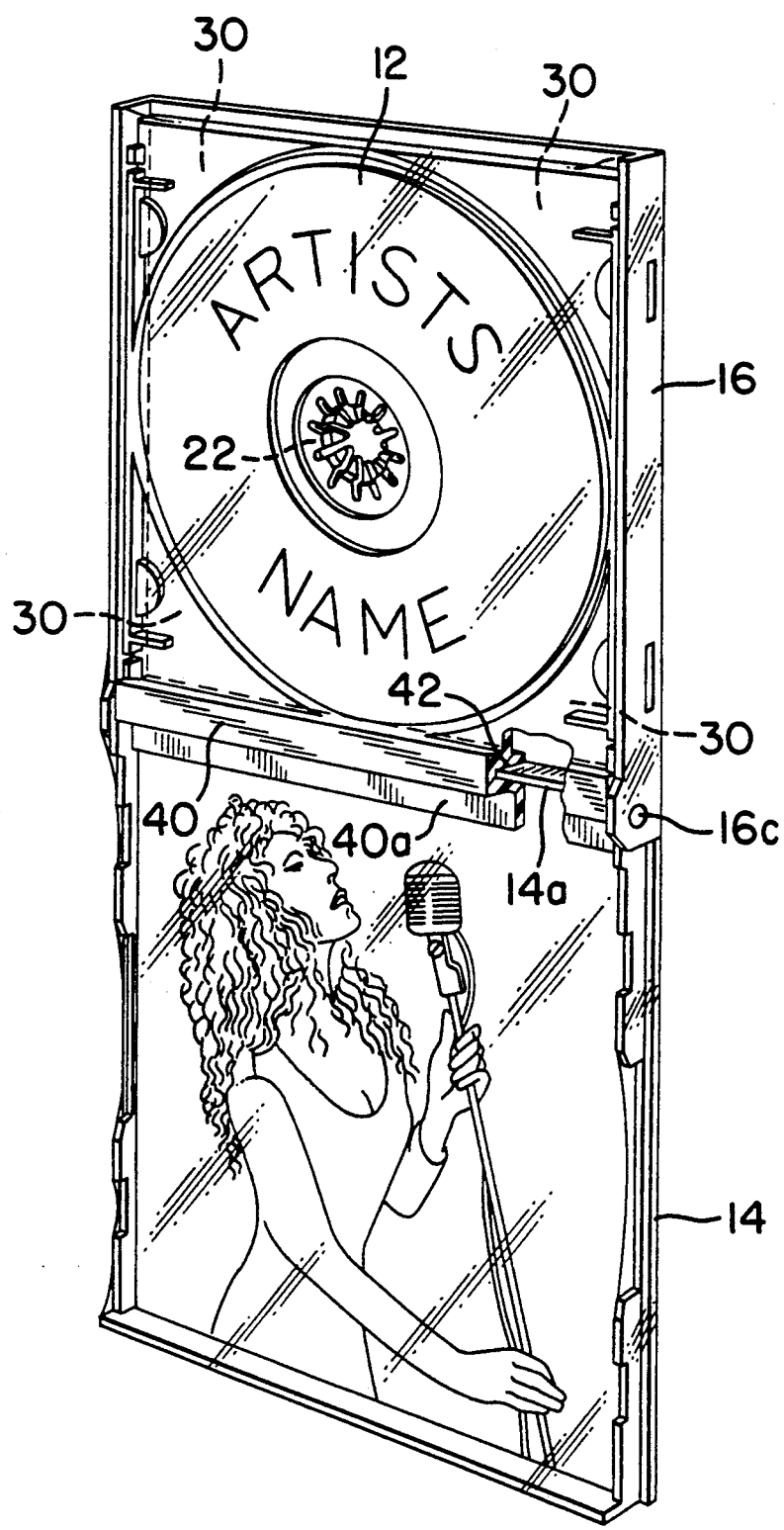
FIG. 4 is a perspective view of the retail package of the invention.

Referring now to FIGS. 4 and 5, the elevated portion of the tray and the slot 42 formed therein is used to lock the jewel-box in the full-open position for retail display. More particularly and with reference to FIG. 4, which shows the product assembled for retail display and sale, the compact disc is placed, graphics side down, in the recess 20 of the transparent tray 38, in which it is removably secured by the array of spring fingers 22. The tray and assembled disc are then placed, face down, in the cover 16 with the elevated portion 40 overlying the axis of the hinge connection and with the slot 42 engaging the hinge-end wall 14a of the base, thereby to jamb the hinge and lock the jewel box in a full-open position. As best seen in FIG. 5, the end wall 14a of the base is completely received in the slot so as to be firmly engaged therein; this coupled with the face-to-face engagement between the overhang 40a and the inner bottom surface of the base 14, enhances the rigidity of the connection between the cover and base. If desired, the usual booklet may be placed in the cover before the tray is inserted, in which case only one of its covers will be visible through the transparent cover, the disc is contained between the booklet and the tray, and graphics on the disc are visible through the transparent tray. Additional graphics may be placed in the now empty base 14 and, if desired, graphics may be placed over the entire substantially uninterrupted and rather large planar surface presented by the outside surfaces of the full-open base and cover. The locked-open box, with the compact disc and graphics material in place, is shrink-wrapped in a thin transparent film, preferably by machine and employing conventional techniques. The completed package has the desired open format which enables retailers to display compact discs in racks formerly devoted to record albums, thereby avoiding extensive store redesign, and also hampers shoplifting.

Figure 6:
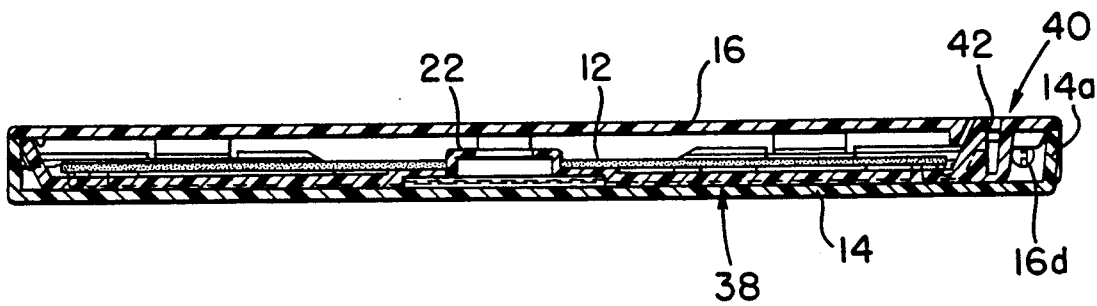
FIG. 6 is an elevation cross-section view of the closed box.

After purchase, the consumer removes and discards the shrink wrap, the only disposable component of the package, removes the tray from the cover and re-positions it face up in the base of the box with the elevated portion in its usual position adjacent the hinge-end wall, and closes the cover over the contained compact disc. The closed jewel box with a compact disc 12 stored therein is shown in cross-section in FIG. 6.

It will have been seen from the foregoing description that the retail CD package according to the invention eliminates the need for an additional larger container for the jewel box and the attendant problem of waste disposal, while achieving the same object by the expedient of modifying the tray of the jewel box in such a way that it can be used for locking the jewel-box in the full open position. This permits the continued use of the jewel box, regarded by many as the cheapest, simplest and most environmentally sound alternative, and one also favored by consumers, with a minimum of retooling. No retooling is required for the base and cover, and only minimal redesign of existing tray molds is necessary to remove the overhang and provide the slot in the elevated portion. The compact disc itself and its label graphics are clearly visible, and the package maximizes the space available for additional graphics for easy readability by a purchaser browsing through a dealer's display rack.

While a currently preferred embodiment of the invention has been described, modifications will now readily occur to those skilled in the art. For example, although the modified tray preferably is formed of transparent material for visibility of the label graphics, should this not be a critical requirement, the tray can be made of opaque material as is done currently. Accordingly, the invention is not to be limited to the exact construction illustrated and described, it being intended to cover by the appended claims such modifications and equivalents as fall within the spirit and scope of the invention.

I claim:

1. Package for retail display of a compact disc having an artwork-bearing upper surface, an information-bearing lower surface and a center hole, said package comprising:

a shallow transparent storage box consisting of a base having parallel side walls and first and second parallel end walls, and a cover having no end walls and parallel side walls hingedly connected to said base by hinge connections formed in the base side walls at locations near said first end wall and which overlie the outer surfaces of corresponding base side walls when the box is closed and the width of which determines the height of the closed box;

a rectangular tray having a recess in its upper face in which said disc is releasably supported and an integral elevated portion disposed along one end of the tray and having a slot therein which extends throughout its length, said tray being fitted in said box cover with its upper face facing downward and with said slot engaging said first end wall of said base for jamming said hinge connections and locking said cover full open so as to be coplanar with said base thereby to form a flat article which is substantially twice as long as it is wide; and a shrink-wrapped transparent film covering the exterior surfaces of said flat article which is easily removed by a consumer after purchase, said tray after removal of said shrink wrap being removable from said cover for placement face up in said base, allowing said box to be closed for storage of said compact disc.

2. Package for retail display of a compact disc according to claim 1, wherein said tray is transparent.

3. Package for retail display of a compact disc according to claim 1, wherein said tray is transparent and has a centrally located circular array of spring fingers frictionally engaging the center hole of said disc and said disc is supported in said recess with its upper surface facing downward, whereby the artwork on the disc is visible through the tray.

4. Package for retail display of a compact disc according to claim 1, wherein the elevated portion of said tray has an overhang throughout is length which projects outwardly from said slot for engaging the inner bottom surface of said base for enhancing the rigidity of said package.

5. Package for retail display of a compact disc according to claim 3, wherein a booklet describing the selections recorded on the disc is confined between said tray and said cover and said base contains artwork visible through said transparent film.

6. A container for displaying and storing a recorded medium, including:

a) a base;
   b) a lid pivotally mounted on the base for movement because a fully open display position, in which position the lid extends generally in the same plane as the base, and a closed storage position wherein the lid is juxtaposed on the base for retaining the recorded medium therebetween;
   c) first lock means for maintaining the lid in its fully open display position; and
   d) a tray having means thereon for holding the recorded medium between the lid and said tray when the lid is in the fully open display position and for holding the medium within the base after the lid has been moved to the closed storage position.

7. The container defined in claim 6 including graphics card means extending over at least part of the base and lid when the lid is in the fully open display position and for subsequent placement within the lid or base after the lid has been moved from said fully open position.

8. The container as defined in claim 7 including an outer wrap of transparent plastic material enclosing the lid, base and graphics card means when the lid is in its fully open display position.

9. The container defined in claim 6 including means for holding the tray within the base after the lid has been moved to the closed storage position.

10. The container defined in claim 6 in which the recorded medium is a compact disc.

* * * * *